3,686,233
RECOVERY AND PURIFICATION OF
METHYL VIOLET DYES
John Edson Gordon, Martinsville, and Martin Louis Feldman, East Brunswick, N.J., assignors to American Cyanamid Company, Stamford, Conn.
No Drawing. Filed Jan. 20, 1970, Ser. No. 4,414
Int. Cl. C09b 11/14
U.S. Cl. 260—391                                              7 Claims

ABSTRACT OF THE DISCLOSURE

Methyl Violet dye (C.I. 42,535) is obtained in a purified or concentrated condition from its aqueous dispersions by adding sufficient alkali to precipitate the dye base, the precipitation being carried out in the presence of a water-immiscible nonpolar solvent for the dye base in which the salt form of the dye is insoluble, followed by separating the resulting base solution and acidifying it to recover the Methyl Violet dye.

---

This invention relates to the recovery of Methyl Violet dyes from aqueous dispersions containing them. More particularly, it relates to an improved process for obtaining Methyl Violet dyes in a more pure, more concentrated or other advantageously modified condition from aqueous solutions of these dyes or from aqueous suspensions of their metal complexes.

Methyl Violet (Colour Index No. 42,535) is a well-known triarylmethane dye which is a mixture of tetra-, hexa-, and mostly pentamethyl pararosaniline hydrochlorides. According to Venkataraman, "The Chemistry of Synthetic Dyes," vol. II, p. 719, Academic Press, 1952, it is generally prepared by the oxidation of dimethylaniline with copper sulfate as catalyst, phenol and a large amount of sodium chloride or other alkali metal salt being used as diluents. The oxidizing agent is often air although other agents such as chlorates may be used. The phenol has been replaced by an emulsifying agent in one variation of the process (U.S. Pat. No. 2,816,900, Herrick et al. to American Cyanamid, Dec. 17, 1957).

The Methyl Violet is usually isolated from the condensation-oxidation mixture by a multistep procedure including removal of the phenol and salt, conversion of the copper to copper sulfide and its removal, and final separation of the dye by water extraction followed by salting of the extract or by precipitation of the color base with caustic, filtration, washing, and re-acidification to the dye. These steps are numerous and time-consuming; there is some loss of product and it is difficult to remove all objectionable impurities.

It has now been found that the separation of Methyl Violet from impurities, and particularly those which accompany its preparation, can be simplified by means of a selective solvent procedure. In accordance with this discovery an aqueous Methyl Violet dispersion (i.e. a solution of its salt with an acid or a suspension in water of its water-insoluble copper complex) is reacted with an inorganic base in the presence of a water-immiscible solvent for the color base that is liberated by the reaction. This produces a solution of the color base that is substantially free from the inorganic salts and other contaminants of the Methyl Violet, and from which a purified Methyl Violet dye can be precipitated by reacting the color base with an acid.

In one embodiment of the invention this extraction procedure is applied at a point in the dye manufacture at which the Methyl Violet is still present as a solid copper complex. This eliminates the need for decomposition of the complex and prior precipitation of the copper. The extraction mixture is clarified to remove precipitated copper hydroxide prior to separating the aqueous and non-aqueous layers. This copper hydroxide is immediately available for recovery and recycle to the process as $CuSO_4$. The organic solvent solution can be separated easily from the aqueous preparative reaction mixture and the Methyl Violet recovered as a paste by acidification using an inorganic acid such as sulfuric or an organic acid such as oxalic.

In another embodiment the combined liberation and extraction process is used to separate Methyl Violet from its aqueous solutions. This can be useful in purifying or in simply concentrating aqueous solutions of Methyl Violet or in converting a solution of the Methyl Violet salt with one anion into its salt with a different anion, such as transforming the chloride into the sulfate.

Other embodiments of the invention will become apparent from the following detailed descriptions and illustrations of the principles thereof.

Methyl Violet dyes are water-soluble quaternary ammonium salts, the formula of their principal constituent usually being written as

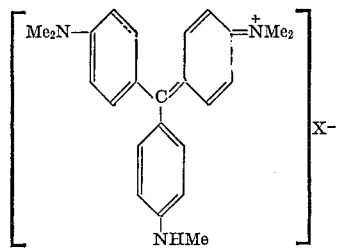

in which X is an anion such as chloride, sulfate or oxalate. When this anion is neutralized, usually by reacting an aqueous solution of the dye with an inorganic base, a brown material is precipitated that is called Methyl Violet dye base. Unless the precipitation conditions are exactly right this base forms a gummy mass that is difficult to filter and wash. The present invention avoids this disadvantage by liberating the Methyl Violet dye base from the dye in the presence of a selective solvent for the dye base, so that the base is extracted into the solvent as it is formed and no precipitation occurs.

The process of the invention is preferably carried out in the following manner. An organic solvent is added to a mixture containing Methyl Violet, which may be a Methyl Violet preparative reaction mixture, an aqueous solution of Methyl Violet, or the like. The aqueous mixture containing the Methyl Violet in the form of a dispersion of solid particles of a Methyl Violet copper complex may be added directly to the organic solvent; or alternatively, it is also possible to filter off these solids and add only the solids to a stirred solvent—water mixture, discarding the filtrate.

A base such as a solution of sodium hydroxide or sodium carbonate is then added to the Methyl Violet-solvent-water mixture, and the resulting mixture is heated at a temperature well below its boiling point for several hours while stirring. The hot mixture is filtered, removing solid copper hydroxide, and the filtrate is allowed to settle into two phases. The organic solvent phase which contains the Methyl Violet color base as a solute is separated, heated, and slowly treated with dilute aqueous acid such as hydrochloric acid. The mixture is then allowed to settle. Methyl Violet paste is drawn off and can be converted to liquid, powder, crystalline, or base types by standard procedures. The organic solvent is recycled directly for another extraction. The separation copper hydroxide may then be converted to a soluble copper salt or reuse in the preparation reaction.

The organic liquid solvent used in this process is one that is water-immiscible in order to facilitate its ready separation from the aqueous phase. It must be a solvent for the base form of Methyl Violet, but it should be one in which the Methyl Violet salts and its copper complex are not very soluble. The liquid nonpolar organic solvents are suitable for this purpose, representative solvents of this class being the mononuclear aromatic hydrocarbons such as benzene, lower alkylbenzenes including toluene, ethylbenzene, isopropylbenzene and the like, xylenes, mesitylene and other poly-lower alkylbenzenes. Chlorobenzene, carbon tetrachloride and other similar chlorinated hydrocarbons can likewise be used. The selection of an appropriate water-immiscible solvent will be evident from these examples and from the requirements outlined above.

Any inorganic alkali can be used to precipitate the copper from its Methyl Violet complex or to combine with the anion of the Methyl Violet dye. Water-soluble alkalies such as sodium or potassium hydroxide or carbonate are preferred, but other alkalies such as the alkaline earth metal hydroxides may be used. The alkali may be added as an aqueous solution or in solid form.

The order in which the organic solvent and the alkali are added to the aqueous Methyl Violet dispersion is not of major importance, the critical factor being that the solvent must be present at the time when the alkali is reacted with the Methyl Violet compound so that it can dissolve the dye base as it is liberated. This reaction usually takes place rather slowly, so there is ample time to add both materials in any order that may be desired.

The extraction process of the present invention involves fewer steps than the customary isolation procedures, thereby saving time and labor. At the same time, yield and purity of the Methyl Violet is increased; also, effluent volumes are lowered and effluent purity is improved. In addition, the procedure allows a much more economical recovery of the expensive copper salt catalysts than in standard procedures since preparation of copper sulfate from copper sulfide requires drastic conditions and special equipment. The process of this invention is not limited to the separation of Methyl Violet from its preparative reaction mixture but can be used to treat any aqueous solution or dispersion of Methyl Violet. Among its applications, the process provides an easy method for converting a dilute solution of Methyl Violet containing salt to one that is concentrated and salt-free, for converting a solution of Methyl Violet as the chloride to a solution of Methyl Violet in the form of another salt such as the sulfate, or for converting a solution of Methyl Violet to one of higher concentration.

The method of isolating Methyl Violet used in this invention differs from the prior art in that the Methyl Violet is separated from the mixture in which it is present by extraction of the base rather than the inorganic salts, diluents, impurities, etc., being removed from the Methyl Violet. It also differs from earlier procedures involving precipitation of the color base in that basing out of the color base and solution of the color base take place simultaneously and a solid form of the color base is never actually present.

In addition to saving time and labor, there are other advantages in the process of this invention. Methyl Violet is separated from its aqueous mixtures without the need for any salting out steps, without precipitation of the color base and its attendant difficulties, without any recovery steps, and without any separate extraction of impurities. There are only two colorless effluent streams. The expensive copper salt catalysts can be recovered more economically than is the case with other procedures. Also, there is the advantage that concentrated solutions of a variety of Methyl Violet salts are easily prepared from the organic solvent solution of the Methyl Violet dye base.

The invention will be further described and illustrated by the following examples, which set forth specific embodiments thereof. It will be understood, however, that although these examples may describe some of the more specific features of the invention they are given primarily for purposes of illustration, the broader aspects of the invention not being limited thereto.

EXAMPLE 1

Isolation of Methyl Violet as a paste from a preparative reaction mixture

A preparative reaction mixture is made by following the procedure described in U.S. Pat. No. 2,816,900 to the point where the oxidation reaction is substantially complete. Two hundred and forty parts of a Methyl Violet oxidation-condensation mixture, with the Methyl Violet in the form of a copper complex, is prepared in this manner.

This copper complex is filtered, the filtrate discarded, and the solids, about 92 parts, added to a stirred mixture of 800 parts chlorobenzene and 300 parts water. After addition of 50 parts of 24% aqueous caustic, the mixture is stirred and heated at 65° C. for about 3 hours. The hot mixture is then filtered with the solids being washed with 50 parts chlorobenzene followed by 50 parts water. The washes can be either added to the filtrate or held for use in the next extraction. The solid, consisting mainly of copper hydroxide may be converted separately to copper sulfate for use in the preparation reaction.

The two phase filtrate is allowed to settle. The chlorobenzene layer is then drawn off, the aqueous layer being discarded. The chlorobenzene layer is stirred and heated to 75° C. 64.5 parts of 8.5% aqueous hydrochloric acid is slowly added, the mixture stirred for 15 minutes, and the final mixture allowed to settle. Methyl Violet paste is drawn off, and the chlorobenzene can be recycled directly to another extraction. The dye paste may be treated to give liquid, powder, crystalline or base types by standard procedures.

EXAMPLE 2

Preparation of solutions of Methyl Violet which are free of inorganic salts. Concentration of solutions of Methyl Violet One thousand parts of a dilute, approximately 1% aqueous solution of Methyl Violet containing dissolved inorganic salts is mixed with 100 parts of chlorobenzene. The mixture is stirred at ambient temperatures and to it is added 50% aqueous sodium hydroxide solution slowly until the violet color is replaced by a brownish color and the pH is 9. After stirring for an additional 15 minutes, the mixture is allowed to settle for one hour. Any solids that are present are removed by filtration. The organic layer is then separated, stirred, and treated with dilute aqueous hydrochloric acid added dropwise; the amount of acid used contains 0.93 parts hydrogen chloride. The mixture is stirred for 15 minutes and allowed to settle for one hour. The final two layers are separated into an aqueous salt-free solution of Methyl Violet and an organic layer which may be recycled.

The concentration of the final aqueous solution of Methyl Violet is determined by the strength of the aqueous hydrochloric acid used to acidify the organic solvent solution of the Methyl Violet color base. This can be varied as desired.

It will be evident from these examples that the amount of organic solvent used to extract the Methyl Violet mixture is not critical; it should be sufficient to insure complete extraction of the Methyl Violet but should not be so great that the resulting solution is overly dilute. The amount of water depends upon the Methyl Violet mixture to be extracted. No water need be added to the solvent if an aqueous solution of Methyl Violet is to be extracted whereas enough water should be added to the extraction of filtered Methyl Violet-complex solids to make the extraction mixture sufficiently fluid. There is no danger of adding too much water since it will not interfere with the extraction and is discarded after the organic solvent solution is separated. Enough water should be present to dissolve all the caustic and salts of the mixture.

The caustic may be added to the extraction mixture in the form of an aqueous solution or as solid pellets. The aqueous solutions may be of any concentration; the choice is mainly one of convenience. The amount of caustic used should be at least slightly in excess of the amount required to convert all of the Methyl Violet to its color base. Use of a larger excess is more desirable to insure complete conversion. The amount of excess caustic which may be used is unlimited, but for practical reasons, an excess of 20 to 30% is preferred. The caustic may be any inorganic base including potassium hydroxide, sodium hydroxide, sodium carbonate, and the like.

In the step in which the Methyl Violet is removed from the organic solvent solution of its color base form by acidification, the acidification is carried out at an elevated temperature but at one which is again well below the boiling point of the mixture. The acid may be diluted with water, an acid of about 5 to 10% strength being satisfactory. The amount of acid used should be just enough to react with all of the color base in the organic solution or just slightly less than that amount. Excess acid should be avoided or the Methyl Violet paste will be too acidic and too dilute. Any acid may be used for this purpose; the choice will depend primarily on the anion that is desired in the product Methyl Violet dye. This is most frequently produced as the chloride, sulfate or oxalate and therefore hydrochloric acid, sulfuric acid and oxalic acid are most commonly used. It is an advantage of the process, however, that any other acid can be substituted if desired, and therefore the invention is not limited in this respect.

What we claim is:

1. A method of obtaining Methyl Violet dye from an aqueous dispersion of a Methyl Violet compound which comprises liberating Methyl Violet dye base from said compound by reacting it with an inorganic base, the reaction being carried out in the presence of a water-immiscible nonpolar organic solvent for said dye base in which said Methyl Violet compound is insoluble, thereby dissolving the dye base in the solvent as it is formed, separating the resulting dye base solution from the aqueous phase, and precipitating Methyl Violet dye therefrom by reacting the dye base with an acid.

2. A method according to claim 1 in which the nonpolar solvent is a member of the group consisting of mononuclear aromatic hydrocarbons, chlorobenzene and carbon tetrachloride.

3. A method according to claim 1 in which the Methyl Violet compound is a Methyl Violet-copper complex.

4. A method according to claim 1 in which the Methyl Violet compound is a salt.

5. A method for recovering Methyl Violet dye from a suspension of its copper complex in water which comprises adding to said suspension a water-immiscible nonpolar solvent for Methyl Violet dye base in which both the said dye and its copper complex are insoluble, also adding sufficient alkali metal hydroxide to liberate the Methyl Violet dye base from the copper complex, reacting the alkali metal hydroxide with the said complex and thereby causing the dye base to dissolve in the nonpolar solvent as it is liberated while precipitating the copper, withdrawing the resulting dye base solution from the aqueous phase and the precipitate, and separating a Methyl Violet dye therefrom by reacting the dye base with an acid.

6. A method according to claim 5 in which the nonpolar solvent is a member of the group consisting of benzene, lower alkylbenzenes, xylene, chlorobenzene and carbon tetrachloride.

7. A method of obtaining a purified Methyl Violet dye from a water solution thereof containing dissolved inorganic salts which comprises adding to said solution a water-immiscible nonpolar solvent for Methyl Violet dye base in which the salt form of the dye is insoluble, also adding sufficient alkali metal hdyroxide to liberate the Methyl Violet dye base, reacting the alkali metal hydroxide with the dye and thereby causing the dye base to dissolve in the nonpolar solvent as it is liberated from the dye, withdrawing the resulting dye base solution from the aqueous phase, and recovering a purified Methyl Violet dye therefrom by reacting the dye base with an acid.

References Cited

UNITED STATES PATENTS 1,878,530   9/1932   Kyrides _____ 260—393

LORRAINE A. WEINBERGER, Primary Examiner

L. A. THAXTON, Assistant Examiner